United States Patent [19]

Rauschenbach et al.

[11] 4,384,163
[45] May 17, 1983

[54] ULTRA LIGHTWEIGHT FOLDING PANEL STRUCTURE

[75] Inventors: Hans S. Rauschenbach, Torrance; Saul Bashin, Sepulved; Barry N. Smith, Palos Verdes Estates, all of Calif.

[73] Assignee: TRW Inc., Redondo Beach, Calif.

[21] Appl. No.: 258,161

[22] Filed: Apr. 27, 1981

[51] Int. Cl.³ .................. H01L 31/04; B64G 1/10
[52] U.S. Cl. ........................ 136/245; 136/292; 160/213; 244/173
[58] Field of Search ............ 136/245, 292; 244/173; 160/213

[56] References Cited

U.S. PATENT DOCUMENTS 3,756,858  9/1973  Dillard ............................ 136/245
4,101,101  7/1978  Barkats et al. .................. 244/173

OTHER PUBLICATIONS

E. N. Costogue et al., "Ultra-Low-Mass Flexible Planar Solar Arrays Using 50 Micron Thick Solar Cells", *Conf. Record, 13th IEEE Photovoltaic Specialists Conf.*, (1978), pp. 200–207.

*Primary Examiner*—Aaron Weisstuch
*Attorney, Agent, or Firm*—James W. Paul; Robert W. Keller

[57] ABSTRACT

A deployable panel structure for spacecraft solar cell arrays and other collapsible panel structures. The panel structure consists of a number of panel sections mounted edge to edge along parallel hinge lines by hinges which allow the panels to be collapsed accordian fashion toward a support. The panels are attached to and deployed by an extendable boom which is extended from and retractable to the support. In the deployed configuration, the panels are extended to form a planar surface in which the boom is essentially coplanar. The panel sections are formed from a plurality of layers of thin film insulative substrate which is stiffened with ribs formed into the substrate during the manufacturing process. The hinges are formed of the same material as the substrate and bonded to the edges of the panel. The bonding is accomplished while the panels are in the folded, face-to-face position such that maximum stored energy and out-of-plane stiffness is available in the deployed configuration. Power from the solar cells is collected by a ribbon cabling system integrally or separately formed with the substrate and hinge system so as to minimize stowed size and mechanical complexity.

9 Claims, 8 Drawing Figures

ULTRA LIGHTWEIGHT FOLDING PANEL STRUCTURE

BACKGROUND OF THE INVENTION

1. Field of the Invention

This invention relates to deployable panel structures for spacecraft and similar applications in which high ratios of area to weight and deployed area to collapsed volume are desirable. The invention will be disclosed in connection with a deployable and retractable solar array of the type typically used to generate power aboard spacecraft. Specifically, this invention is for an improved structural design for large area solar arrays of ultra light weight which may be deployed and refolded in a space environment.

2. Prior Art

Deployable solar arrays utilizing solar cells mounted upon a foldable structure are well known in the art and widely used for the generation of power aboard spacecraft. These deployable solar arrays have typically been constructed of honeycomb structures or other light, rigid panels upon which the solar cells were mounted, the panels being hinged to one another on hinge lines perpendicular to the direction of deployment. In one such concept, rigid rectangular solar panels are arranged face to face in accordian fashion when in the collapsed position. Deployment is effected by means of an extensible boom which is extended from a central support, the outer end of the boom being attached to the outer panel of the solar array such that the solar panel is deployed to an essentially planar configuration by the extension of the boom.

As the requirements for more power for satellites have developed there has been increased pressure to develop advanced concepts which will reduce the weight and stowed envelope size of solar arrays in order to provide a greater ratio of power generated in orbit to folded size and weight of the array. These requirements led to attempts to reduce or eliminate the rigid panel structures, but these reductions have caused serious difficulty in control of panel geometry and deployment kinematics. In particular, as the rigidity of panels is reduced, it becomes progressively more difficult to prevent bending of the panels between hinges, especially if an attempt to fold the panels back to the predeployment configuration is made. This problem is primarily due to the fact that the normal means of deployment is to attach the outer end of the outermost panel to the outer end of an extensible boom, the inner end of which is mounted on the central support of the solar array. During deployment the extensible boom outer end travels away from the central support, unfolding the solar panel as it extends. Intermediate dynamics are relatively unimportant as the panel when deployed is stretched tight by the extended boom.

The advent of the space shuttle and its ability to recover spacecraft from orbit has created a requirement that spacecraft be recoverable and restowable in the space shuttle in order to be returned to earth for refurbishment. Furthermore, the desire to conduct a number of experiments housed in the space shuttle required that the shuttle itself be able to deploy and recover a solar panel capable of producing large amounts of electrical power.

Refolding the panels of such a solar array, however, present serious difficulties, even in a zero gravity environment. This is due to the fact that intermediate panels between the end panels, if uncontrolled by additional mechanism, may pivot away from the boom, thereby defeating the restowing attempt. One means of preventing such an undesired kinematic result is to preload the hinge means to the stowed position so that the retracting of the boom is not the primary stowing force. The preloaded hinges therefore control the folding kinematics. This scheme has two primary disadvantages. One is the relatively stronger (and therefore heavier) boom required to overcome the hinge forces. The other is that in order for the hinge preload to be effective, panels must have sufficient rigidity to remain relatively flat between the hinges during deployment and restowage. Otherwise the panels themselves would bend and pivot away between hinges, thereby defeating the refolding attempt.

Previous attempts to utilize thin film panels have not been designed such that any stored energy in the hinges is propagated any significant distance in the panels from the hinges, primarily due to the fact that the thin film panels lack sufficient bending rigidity. The prior art has attempted to control thin film panel dynamics with intermediate connections between the extensible boom and/or linear guide tubes and wires and the panels. These methods result in considerable mechanical complexity, increased weight and potential low reliability of deployment and retraction due to the greater number of connections and sliding joints of this approach.

Another problem which has been inherent in the design of foldable solar panels for spacecraft use has been the requirement to place a "blanket" between the panels in the folded position in order to prevent face to face contact between the optical covers of the solar cells. This blanket adds weight to the panel assembly in the collapsed position and is a further reliability problem during deployment since it must be projected far enough from the panels during deployment to prevent its interfering with the solar panel function.

SUMMARY OF THE INVENTION

Our invention is for an improved deployable panel structure which includes a plurality of ultra lightweight integrally stiffened panels, hinges connecting the panels so as to control folding and unfolding kinematics, and a cabling system for the collection of power from solar cells. The cabling system is mounted upon the panels, integrally formed with the panel and hinge structures, is of minimum weight for the electrical power transmitted and the cabling causes minimum interference with the operation and mechanical properties of the hinges and panels.

Since the size and weight available aboard spacecraft is severely limited, a primary goal in the design of spaceborne solar cell power systems is the maximization of the ratio of deployed area (and therefore power generated for a given state of the art in solar cells) to collapsed volume and total solar panel weight. The use of large arrays aboard recoverable spacecraft such as the space shuttle also requires that advanced solar arrays of the type contemplated must be capable of being refolded in order to prevent the loss of the array upon return to earth. One method by which this invention uniquely satisfies these requirements is by incorporating panel structures which are formed of ultra lightweight, integrally stiffened insulative material of the type normally used to electronically isolate the solar cells, thereby utilizing the same material as a structural and insulative mounting, or substrate, for the solar cells. This material, in this application Kapton, a high dielectric constant plastic film, is utilized in two layers bonded by a compatible adhesive. Each layer of film has parallel stiffening ribs formed into its surface so as to provide bending stiffness in the direction of the ribs. The two layers of reinforced film are then bonded on the surface opposite the ribs formed in the film at a 90 degree angle to one another so that the composite film substrate has substantial bending stiffness in both orthogonal planes vastly greater than an unreinforced substrate.

A further benefit to this construction is that when the ribs are constructed so as to have a height above the plane of the substrate greater than the mounted height of a solar cell, the solar cells may be mounted between adjacent ribs, the ribs thereby providing protection for the surface of the solar cells when the panels are folded face to face in the collapsed position, since the ribs contact the solar cells before the solar cells will contact one another. This feature allows the elimination of the protective "blanket" of cushioning material normally used to prevent solar cell to solar cell contact in the folded position with a resulting decrease in weight, cost and complexity.

An important requirement for solar panels is that they display significant resistance to folding about the longitudinal axis of deployment. If this were not the case, the result would be that the array would no longer be planar, thereby losing projected area and power generation capability. Common examples of such out-of-plane behavior are that exhibited by film as it is pulled from a spool or flypaper as it is unfurled.

Our invention provides this out-of-plane stiffness by two means; the integrally stiffened panels as discussed above and the design of the hinge means as described below.

A feature of our invention is the design of the hinge means which in the deployed position provides maximum stored energy required for deployment and restowage kinematics as described above, while at the same time contributing to out-of-plane stiffness in this deployed position. This feature allows better control of folding kinematics than a hinge of little or no stored energy by providing a gradual increase in "return to the folded position" force, thereby eliminating the requirement for attachment of intermediate panels to the extensible member to control folding and deployment interpanel relationships. At the same time this feature provides greater out-of-plane stiffness than previous hinge designs by projecting above the plane of the deployed panel with the benefits described above. This hinge means feature is accomplished by forming the hinge by bonding parallel portions of the edge of adjacent panels to one another when the substrates are in the folded position, the inner edges of the bond forming the hinge line between adjacent panels.

A refined version of this hinge design includes a distance piece strip bonded between the adjacent layers of the film in the hinge, the thickness of the strip and its width determining the hinge contribution to the out-of-plane stiffness of the hinge in its deployed configuration. The hinge may also be provided with a bonded strip on the inside surface of the hinge, thereby varying the stored energy in the open or closed position, depending upon which position the hinge is in when the strip is bonded in. This inside strip further provides additional structural strength to prevent peeling of the hinge bond. The features of this hinge design will be explained in greater detail later in the application.

While the rigidity provided by the panel construction described herein is less than could be supplied by a more rigid panel construction such as honeycomb, the construction of our invention provides important benefits in terms of superior weight to area ratio and is of sufficient rigidity for deployment in a near zero gravity environment. The combination of stiffened panels and the hinge design also allows the panels to be deployed and retracted without connections between intermediate panels and the extensible boom, thereby considerably decreasing the mechanical complexity of the design and increasing the reliability of the folding and unfolding process.

A further feature of our invention is a cabling system which comprises a strip of fine flexible wires or strips adjacent to the solar cells and parallel to the direction of deployment on the panels. These cables receive wires which collect power from the rows of cells, progressively transferring the power toward the support. In our invention, the power cable is bonded to the panels and is formed in a loop across the hinge so as to provide minimum resistance to the folding process and minimum interference with the designed stored energy characteristics of the hinge.

BRIEF DESCRIPTION OF THE DRAWINGS

FIG. 1a illustrates the initial deployment of the solar panel in its folded configuration from the space shuttle;

FIG. 1b illustrates the panel partially deployed from the support;

FIG. 1c illustrates the panel fully deployed;

DESCRIPTION OF THE PREFERRED EMBODIMENTS

Figure 1:
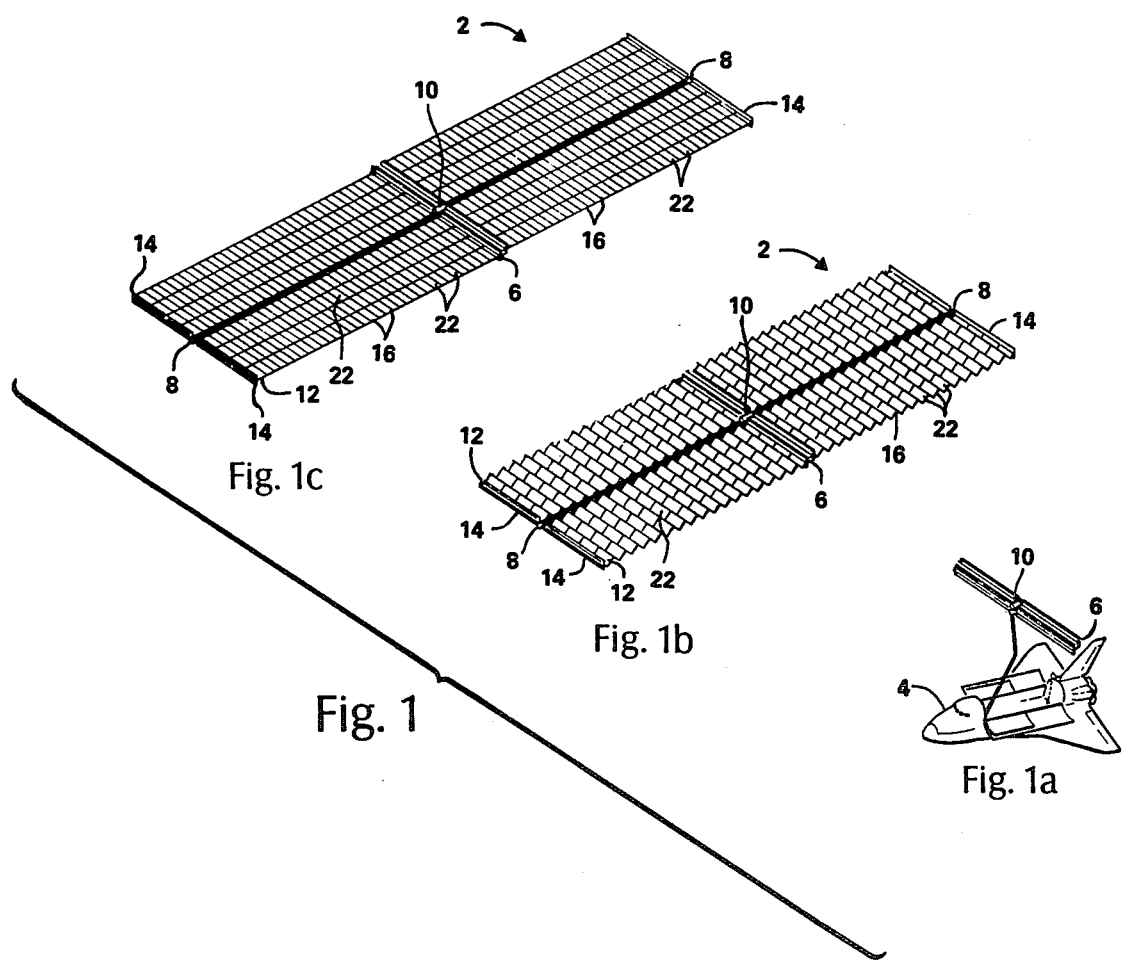
FIG. 1 illustrates the deployment sequence of a solar panel according to the invention from the space shuttle.

The drawings illustrate a folding deployable solar array 2 according to our invention. In the embodiment depicted, the array 2 is deployed from a spacecraft, the space shuttle 4 being illustrated. The array 2 is folded about and extended from support 6 by means of the extensible member 8. Extensible member 8 may be any one of a type well known in the art exemplified by coil spring metal strips which are stressed to curl laterally into a tubular configuration having its central axis parallel to the longitudinal axis of the array. The inner end of the extensible member 8 is secured to the support 6 by a drum 10 from which the extensible member is deployed.

The outer end of the extensible member 8 is secured to the outer edge of the outer panel 12 by hinge means 16 to structural member 14 which extends from extensible member 8 at its outermost extremity and is perpendicular to the axis of extensible member 8.

Figure 4:
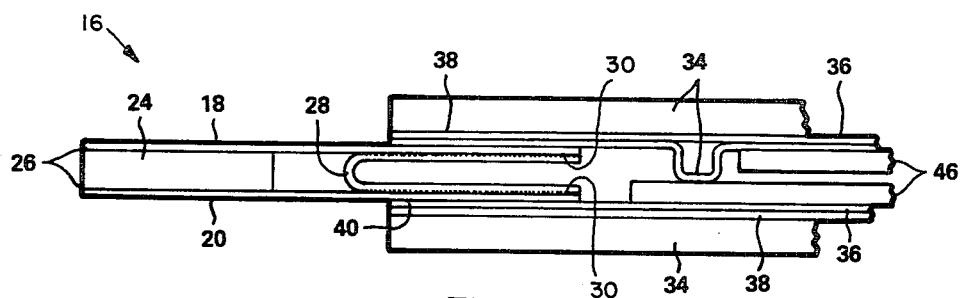
FIG. 4 is a cross-section of the hinge configuration and a portion of the adjacent panels illustrating the construction of the hinge and the relationship of the solar panel details in the folded configuration.

As shown in FIG. 4, hinge means 16 are formed by bonding the insulative substrates 18, 20 which form the panels 22, at their edges with adhesive 26, the bonding occurring when the adjacent panels are placed face to face in the collapsed position. Thus the stored energy of the hinge is minimized when folded and maximized when deployed. In the preferred configuration, substrates 18 are fabricated of an extremely thin, electronically insulative material such as 1 mil Kapton.

In order to provide increased hinge out-of-plane stiffness and thereby decrease the tendency of the thin film substrates to deflect at the hinges, a strip of material 24 which is compatible with adhesive 26 and substrates 18, 20 may be bonded between the adjacent sheets 18, 20 forming the hinge with adhesive 26. A further refinement and control upon hinge stiffness and resistance to peeling of the hinge bond can be provided by bonding an inner skin 28 onto the hinge by adhesive 30, this strip's contribution to stored energy in the open or closed configuration being determined by the position of the adjacent panels to the hinge at the time of bonding and the thickness of the strip.

The control which hinge means 16 has upon deployment kinematics is determined to a large extent by the stiffness of panels 22, since the flexibility of those panels determines to what degree the hinge can control the panels. Since the solar array assembly 2 is being deployed in a near zero gravity field, the rigidity of the panels need not be sufficient to prevent collapse due to a gravity field such as that on earth, but must be sufficient to allow control of panel configuration and geometry during the linear accelerations of orbital operation, folding and unfolding; typically less than 0.1 earth gravity.

Figure 2:
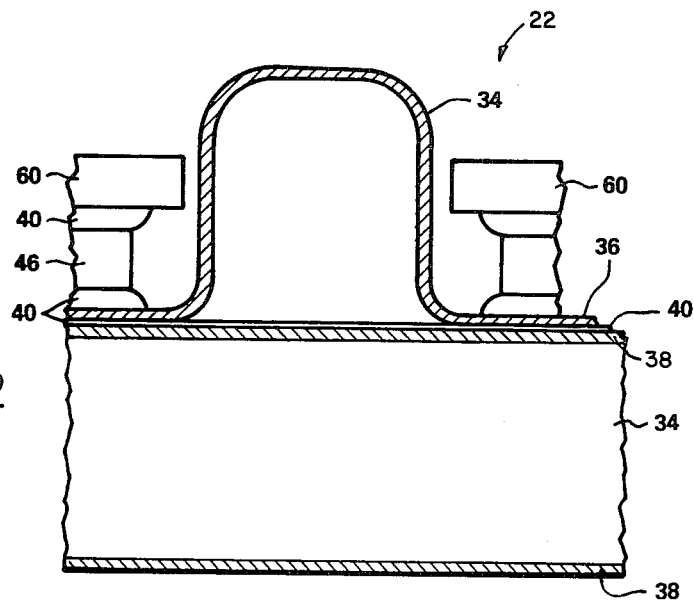
FIG. 2 is a cross-section of the panel structure perpendicular to a rib illustrating that rib, the substrate and solar cell mounting details and a section through the orthogonal rib on the opposite side of the panel structure.
Figure 3:
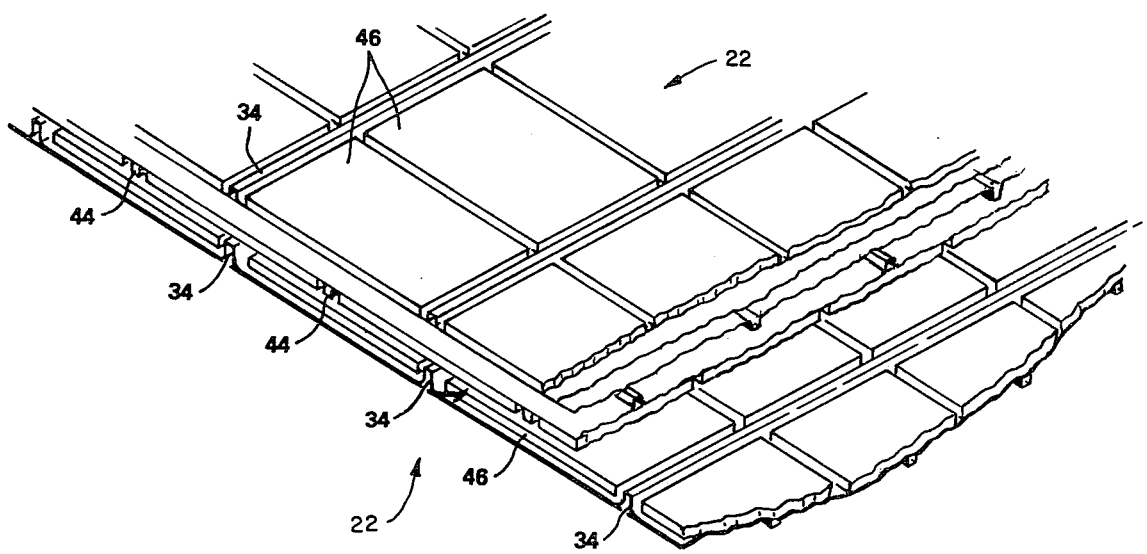
FIG. 3 is a perspective of three panels in the folded face-to-face configuration, showing the relationship of ribs and cells on the panels.

To provide this stiffness as shown in FIGS. 2 and 3, panels 22 are constructed of two layers of insulative substrates 36, 38 into which rows of ribs 34 are formed by heat and pressure. The two substrates 36, 38 are then bonded back to back by suitable adhesive 40 so that the ribs on the adjacent skins are at 90 degree angles so as to provide an orthogonal rib structure on the completed panel with the ribs faced outwardly on opposite sides of the panel. As an alternate means of construction, ribs 34 may be formed separately and bonded to substrate 38 by adhesive 40.

The distance between ribs 34 is such that solar cells 46 may be mounted upon the substrate 36 with adhesive 40 between the rows of ribs. The ribs 44 on the back of mating panels are so spaced and designed that when combined with the ribs 34 on either side of solar cells 46, the solar cell transparent covers 60 are in contact only with the tops of the ribs of the adjacent panels in the stowed configuration. Design of the ribs in the substrates 36, 38 of panels 22 thereby provides both bending stiffness in the panels and protection for the solar cell surfaces in the stowed configuration, thereby eliminating the requirement for an additional soft insulating blanket between folded panels to prevent cell to cell face contact.

Figure 5:
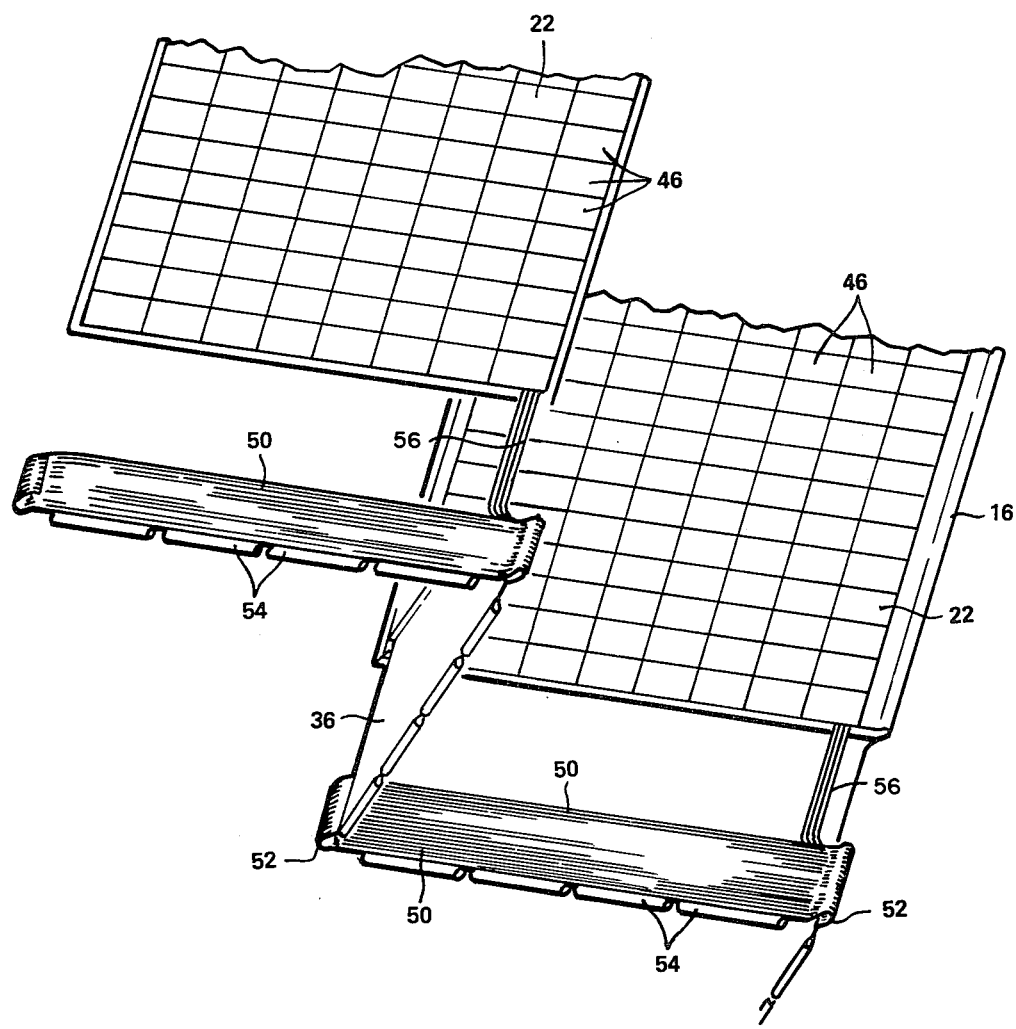
FIG. 5 illustrates the power cabling in relation to the panels and solar cells.

As shown in FIG. 5, in order to collect the power generated by solar cells 46, wires 56 from the solar cells run parallel to the ribs to the edge of panels 22, there connecting to a power harness 50 which is formed of foil or fine wires bonded to the surface of the substrate 36. The power harness 50 is formed into a loop 52 at the hinge 16 thereby offering minimum resistance to bending by the hinges during the folding and unfolding of the panel assembly.

Substrate 36 has a loop 54 formed at the edge of panel 22 so as to assist in handling during manufacture and assembly.

While a specific preferred embodiment has been shown and described as it would relate to a solar power system deployed from the space shuttle, it should be clear that certain modifications could be made which would still be within the scope of the invention. For instance, the ribs, rather than being formed into the substrate, could be formed separately and bonded adhesively to flat sheets of substrate material, and means other than an extensible boom could be used to deploy the panels from their folded to the deployed positions and vice versa.

We claim:

1. A deployable panel structure comprising:
   a support;
   an extensible member attached to said support, said extensible member being deployable outwardly from said support;
   a plurality of panels hinged edge to edge along hinge lines perpendicular to the direction of deployment by a first hinge means, said panels comprising two layers of thin film substrate, each layer of said substrate having parallel rows of ribs formed into said substrate, said ribs providing bending stiffness in the direction of said ribs, said layers of substrate being bonded back to back to one another with the rib axes orthogonally oriented to one another, said panels thereby being provided with bending stiffness about both axes of the panel;
   a second hinge means joining the inner edge of the innermost panel to said support; and
   a third hinge means joining the outermost panel to the outer end of said extensible member at said outermost panel's outermost extremity.

2. A panel structure as defined in claim 1 wherein said ribs are formed separately from the substrates and adhesively bonded to said substrates.

3. A deployable panel structure as defined in claim 1 wherein said first hinge means comprises bonding of adjacent edges of the substrate in the collapsed configuration of the panels such that the inner edge of said bond defines the hinge line between adjacent panels.

4. A deployable panel structure as defined in claim 1 wherein said first hinge means further comprises a strip of material in a plane parallel to the adjacent panels in the folded position, said strip of material being bonded between the adjacent panels at their mating edges such that the inner edge of said strip defines the hinge line between adjacent panels.

5. A deployable panel structure as defined in claim 4 wherein said first hinge means further comprises a strip of thin film material bonded to the substrates at each side of the inner surface of said hinge such that said strip provides an inner surface to said hinge in the deployed configuration, said strip contributing to the stored energy capability of said hinge in the collapsed position and resistance of said hinge bond to peeling in the deployed position.

6. A deployable panel structure as defined in claim 4 which further comprises solar cells adhesively bonded to said panels, said solar cells fitting between said ribs on said substrates, said ribs being formed so as to project higher from said substrate than said solar cells, said solar cells forming a solar cell array on said deployable panel structure.

7. A deployable panel structure as defined in claim 6 wherein said solar cells are electrically connected to a cabling harness, said harness collecting the power generated by said solar cells for transfer from said solar cell array to said support.

8. A deployable panel structure as defined in claim 7 wherein said cabling harness comprises highly flexible thin stranded wire formed into a flat ribbon type of cable, said harness being formed into a loop across said hinges so as to offer a minimum resistance to bending during deployment and collapsing of the panel structure, the insulation of said wires from one another being provided by means of their lateral separation between two bonded layers of substrate material.

9. A deployable panel structure as defined in claim 7 wherein said cabling harness is constructed of thin metal strips bonded to and integral with said thin film substrates and formed into a loop across said hinges so as to offer minimum resistance to bending of said hinges during deployment and collapsing of the panel structure, the insulation of said strips from one another being provided by means of their lateral separation between two bonded layers of substrate material.

* * * * *